US007917803B2

(12) United States Patent
Stefanus et al.

(10) Patent No.: US 7,917,803 B2
(45) Date of Patent: Mar. 29, 2011

(54) DATA CONFLICT RESOLUTION FOR SOLID-STATE MEMORY DEVICES

(75) Inventors: Stefanus Stefanus, Singapore (SG); Feng Shen, Singapore (SG); Wei Loon Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 472 days.

(21) Appl. No.: 12/140,488

(22) Filed: Jun. 17, 2008

(65) Prior Publication Data

US 2009/0313453 A1    Dec. 17, 2009

(51) Int. Cl.
    *G06F 11/00* (2006.01)
(52) U.S. Cl. .................. 714/6; 711/103; 714/5
(58) Field of Classification Search .......... 714/5, 6; 711/103
    See application file for complete search history.

(56) References Cited

U.S. PATENT DOCUMENTS

| | | | |
|---|---|---|---|
| 5,379,256 A | 1/1995 | Tanaka et al. | 365/185 |
| 5,475,693 A | 12/1995 | Christopherson et al. | 371/10.2 |
| 5,574,684 A | 11/1996 | Tomoeda | 365/185.04 |
| 5,584,014 A * | 12/1996 | Nayfeh et al. | 711/134 |
| 5,732,092 A | 3/1998 | Shinohara | 371/40.2 |
| 6,104,638 A | 8/2000 | Larner et al. | 365/185.33 |
| 6,839,798 B1 | 1/2005 | Nagayoshi et al. | 711/103 |
| 6,970,890 B1 | 11/2005 | Bruce et al. | 707/202 |
| 6,988,175 B2 | 1/2006 | Lasser | 711/156 |
| 7,012,836 B2 | 3/2006 | Matsubara et al. | 365/185.18 |
| 7,231,585 B2 | 6/2007 | Vainsencher et al. | 714/784 |
| 7,296,213 B2 | 11/2007 | Vainsencher et al. | 714/784 |
| 7,353,225 B2 | 4/2008 | Dada | 707/6 |
| 2002/0170017 A1 * | 11/2002 | Busser | 714/800 |
| 2004/0064669 A1 * | 4/2004 | Browning et al. | 711/202 |
| 2005/0102326 A1 | 5/2005 | Peleg et al. | 707/200 |
| 2005/0228832 A1 | 10/2005 | Ghotge et al. | 707/200 |
| 2006/0031263 A1 | 2/2006 | Arrouye et al. | 707/200 |
| 2006/0080363 A1 | 4/2006 | Vadlamani et al. | 707/200 |
| 2006/0161725 A1 * | 7/2006 | Lee et al. | 711/103 |
| 2007/0136398 A1 | 6/2007 | Toshine | 707/204 |

* cited by examiner

*Primary Examiner* — Bryce P Bonzo
*Assistant Examiner* — Jeison C Arcos
(74) *Attorney, Agent, or Firm* — Theodore M. Magee; Westman, Champlin & Kelly, P.A.

(57) ABSTRACT

In a particular embodiment, a controller is disclosed that is adapted to control read/write access to a storage media. The controller includes data corruption detection logic to reconstruct a logical block address (LBA) lookup table from metadata stored at the storage media upon restart and re-initialization after a power loss event. The controller further includes duplicate conflict resolution logic to identify a valid data block from multiple data blocks that refer to a single LBA. The duplicate conflict resolution logic counts a first number of valid physical pages and a second number of different sectors in each of the multiple data blocks. The duplicate conflict resolution logic selects the valid data block from the multiple data blocks based on at least one of the first and second numbers.

20 Claims, 5 Drawing Sheets

DATA CONFLICT RESOLUTION FOR SOLID-STATE MEMORY DEVICES

FIELD OF THE DISCLOSURE

The present disclosure is generally related to data conflict resolution for solid-state memory devices.

BACKGROUND

In general, data storage devices are susceptible to data loss or corruption in the event of a power interruption during operation. When a power loss event occurs during a write operation, the data can be corrupted. Further, when such an event occurs during an update of storage device configuration data, such as wear leveling data or directory mapping data, the data may not be recoverable upon subsequent power up and re-initialization.

In some instances, storage systems have incorporated auxiliary power supplies to provide power during a power loss event. Additionally, many storage systems have incorporated redundant data storage techniques to preserve one or more versions of the data in response to such power loss events. However, upon subsequent power up and re-initialization, multiple versions of the data may be stored in memory. Further, when metadata is spread into spare bytes of pages within a flash memory due to an out-of-space update, multiple copies may be mapped to the same logical block address, but only one copy is valid.

SUMMARY

In a particular embodiment, a controller is disclosed that is adapted to control read/write access to a storage media. The controller includes data corruption detection logic to reconstruct a logical block address (LBA) lookup table from metadata stored at the storage media upon restart and re-initialization after a power loss event. The controller further includes duplicate conflict resolution logic to identify a valid data block from multiple data blocks that refer to a single LBA. The duplicate conflict resolution logic counts a first number of valid physical pages and a second number of different sectors in each of the multiple data blocks. The duplicate conflict resolution logic selects the valid data block from the multiple data blocks based on at least one of the first and second numbers.

In another particular embodiment, a processor-readable medium embodies instructions executable by a processor to resolve a conflict between at least two copies of a data block that are mapped to a single logical block address. The instructions include a first instruction that is executable by a processor to reconstruct a logical block address (LBA) lookup table from metadata stored at a storage media after an unexpected power loss event. The instructions further include a second instruction that is executable by the processor to detect a data error including multiple copies of a data block mapped to a single logical block address associated with a storage media and include a third instruction that is executable by the processor to determine a valid physical page value for each copy of the multiple copies. Additionally, the instructions include a fourth instruction that is executable by the processor to determine a data diversity value for each copy of the multiple copies. Further, the instructions include a fifth instruction that is executable by the processor to select a copy from the multiple copies when one of the valid physical page value and the data diversity value associated with the copy is greater than respective valid physical page values and data diversity values of other copies of the multiple copies.

In still another particular embodiment, a method is disclosed that includes detecting a data error that includes a first data block and a second data block that are mapped to a single logical block address of a storage media of a storage device. The method further includes counting a first number of valid physical pages in the first data block and a second number of valid physical pages in the second data block and selecting the first data block as a valid data block when the first number is greater than the second number of valid physical pages. The method also includes selecting the second data block as the valid data block when the second number is greater than the first number of valid physical pages.

DETAILED DESCRIPTION OF ILLUSTRATIVE EMBODIMENTS

Figure 1:
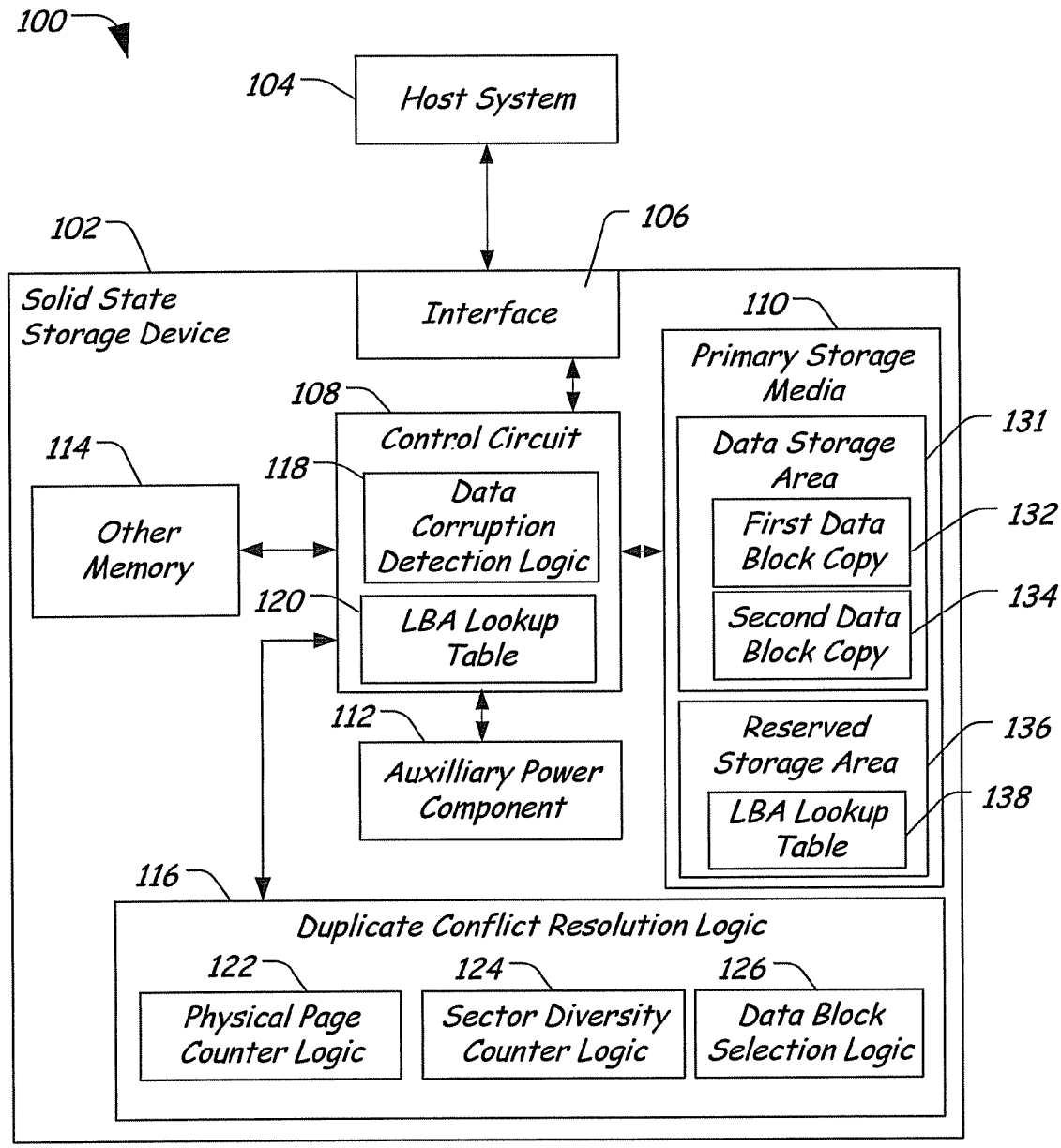
FIG. 1 is a block diagram of a particular illustrative embodiment of a system including a storage device with data conflict resolution logic.

FIG. 1 is a block diagram of a particular illustrative embodiment of a system 100 including a storage device 102 with data conflict resolution logic. In a particular embodiment, the data storage device 102 is a solid-state memory device that is adapted to communicate with a host system 104 via an interface 106. The host system 104 may be a computing system, such a personal computer, a personal digital assistant (PDA), processing logic, another electronic device, or any combination thereof.

The data storage device 102 includes a control circuit 108 that is adapted to communicate with a primary storage media 110 and with other memory 114. For example, the other memory 114 can include flash memory, such as NAND flash memory and NOR flash memory, other solid-state memory, or any combination thereof. In a particular embodiment, the primary storage media 110 is a solid-state storage media that is adapted to store both data blocks and meta-data related to the data blocks. In a particular embodiment, the solid-state memory is a NAND flash memory, a NOR flash memory, other solid-solid state memory, or any combination thereof. In general, each flash page has spare bytes. In a particular example, for single-level cell (SLC) NAND flash, there are 16 spare bytes for every 512 bytes of data or 64 spare bytes for each two-kilobyte page of data. Metadata, including logical block address (LBA) data, is stored in those spare bytes. Thus, when data is corrupted, the same LBA data may appear in the metadata for different data blocks in the solid-state memory. In this particular example, the first data block copy 132 may include an LBA in its spare bytes and the second data block copy 134 may include the same LBA in its spare bytes.

The data storage media 110 includes a data storage area 131 and a reserved storage area 136. In a particular embodiment, a logical block address (LBA) lookup table 138 can be stored at the reserved storage area 136 of the primary storage media 110. In general, the LBA lookup table 138 is used to establish a relation between data blocks stored at the storage media data storage area 131 of the storage media 110 and logical block address data and other metadata stored in spare bytes of the data blocks, such as a first data block copy 132 and a second data block copy 134 within the data storage area 131. The reserved storage area 136 may be a logical portion of the storage media 110 that is restricted for access only by the control circuit 108. In this particular example, the LBA lookup table 138 is stored and updated at the reserved storage area 136. In an alternative example, the LBA lookup table 138 is stored at the other memory 114, such as at a NAND flash memory.

The control circuit 108 is also coupled to an auxiliary power component 112. In a particular embodiment, the auxiliary power component 112 can be a capacitor or a battery that is adapted to supply power to the storage device 102 under certain operating conditions. In a particular example, the auxiliary power component 112 can provide a power supply to the control circuit 108 and to at least one of the primary storage media 110 and the other memory 114 to record data when power is unexpectedly turned off. The control circuit 108 is also coupled to duplicate conflict resolution logic 116. In a particular example, the duplicate conflict resolution logic 116 is a set of instructions stored within a memory (such as a NOR flash memory) that is executable by the control circuit 108 to resolve data conflicts. For example, the duplicate conflict resolution logic 116 can be executed by the control circuit 108 to determine which data block copy out of multiple duplicate copies of a data block is valid.

The control circuit 108 includes data corruption detection logic 118 to detect data corruption. In a particular embodiment, the data corruption detection logic 118 is adapted to detect when the LBA lookup table 138 does not match the real status of the storage media 110 due to unplanned power loss. For example, after a write operation is performed to write updated data to the data portion 131 of the storage media 110, power is lost due to an unplanned power loss event, and the LBA lookup table 138 in the reserved area 136 is not updated. In this instance, upon restart and re-initialization of the storage device 102, the data corruption detection logic 118 detects multiple copies of a data block (such as the first and second data block copies 132 and 134) that are mapped to the same LBA.

Upon restart and re-initialization of the storage device 102 after and unplanned power loss event, the control circuit 108 cannot rely on the integrity of the LBA lookup table 138 at the reserved storage area 136. Instead, the control circuit 108 is adapted to scan all of the metadata stored at the data storage area 131 of the storage media 110 to reconstruct an LBA look-up table 120, which is a mapping of a current state of the storage media 110. During the process of reconstructing the LBA look-up table 120, the control circuit 108 may encounter multiple data blocks, which include metadata in their spare bytes that refer to the same LBA. In this instance, the control circuit 108 uses the duplicate conflict resolution logic 116 to determine which data block is valid.

The duplicate conflict resolution logic 116 includes physical page counter logic 122 to count a number of physical pages associated with each data block, when there are multiple duplicate data blocks. The duplicate conflict resolution logic 116 also includes sector diversity counter logic 124 to count a number of different sectors associated with each data block. Further, the duplicate conflict resolution logic 116 includes data block selection logic 126 that is executable by the control circuit to select a particular data block from the multiple duplicate data blocks as a valid data block. The control circuit 108 can provide the selected data block to the host system 104. Further, the control circuit 108 is adapted to update the LBA lookup table 138 at the reserved storage area 136 based on the selection when reconstruction of the LBA lookup table 120 is completed.

In a particular embodiment, the control circuit 108 is adapted to read metadata associated with the first data block 132 from spare bytes of the first data block 132 and to read metadata associated with the second data block 134 from spare bytes of the second data block 134 to reconstruct the LBA lookup table 120. If the first and second data block copies 132 and 134 refer to the same LBA, the control circuit 108 uses the duplicate conflict resolution logic 116 to determine which copy is valid. The duplicate conflict resolution logic 116 is configured to identify which copy is the latest, freshest copy and selects the freshest copy as a valid copy. In a particular example, the duplicate conflict resolution logic 116 is used by the control circuit 108 to choose a copy that has a greatest number of valid physical pages, to choose a copy that has a greatest amount of data diversity, or any combination thereof.

In a particular embodiment, the data storage device 102 includes the storage media 110 that is adapted to store data and to store metadata within spare bytes. The data storage device 102 further includes a controller, such as the control circuit 108, a processor, or any combination thereof. The control circuit 108 is adapted to control read/write access to the storage media 110. Further, the control circuit 108 includes data corruption detection logic 118. Upon startup and re-initialization, the data corruption detection logic 118 is adapted to determine that an unexpected power loss event occurred previously. The control circuit 108 also includes duplicate conflict resolution logic 116 to detect and resolve data corruption errors by reconstructing the LBA lookup table 120 from metadata stored at the storage media 110. For example, the primary storage media 110 can include a first data block copy 132 and a second data block copy 134 that include metadata that refers to the same LBA, where only one of the copies is valid. The control circuit 108 uses the physical page counter logic 122 and the sector diversity counter logic 124 of the duplicate conflict resolution logic 116 to count a first number of valid physical pages and a second number of different sectors, respectively, in the first and second data block copies 132 and 134. In a particular example, the control circuit 108 also uses the data block selection logic 126 to select a latest, freshest copy as a valid copy, which may be a copy having at least one of a largest first number and a largest second number.

In a particular embodiment, when the number of pages and the number of different sectors in each of the multiple copies is the same, the control circuit 108 is adapted to apply another selection algorithm to select one of the multiple copies as a valid copy. In a particular embodiment, the selection algorithm can be a random selection algorithm adapted to randomly select the copy from the at least two copies. In another particular embodiment, the selection algorithm can be a date/time selection algorithm. In still another particular embodiment, the control circuit 108 may select a particular copy as the valid copy based on load-balancing considerations because some solid-state memory devices degrade with usage. Thus, the particular copy may be selected based on usage to enhance the usable life of the storage media 110.

Figure 2:
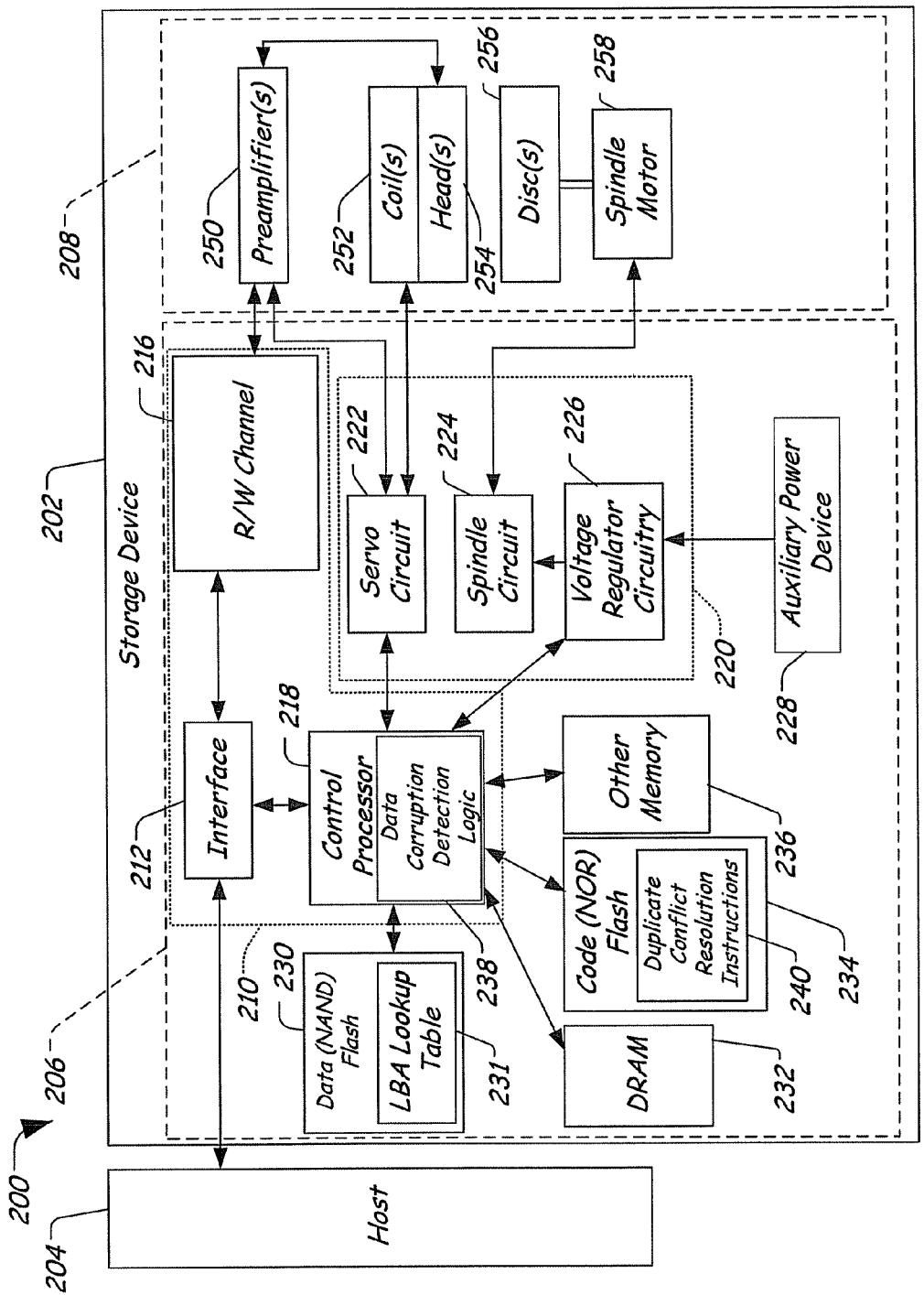
FIG. 2 is a block diagram of a second particular illustrative embodiment of a system including a storage device with data conflict resolution logic.

FIG. 2 is a block diagram of a second particular illustrative embodiment of a system 200 including a hybrid storage device 202 with data conflict resolution logic. As used herein, the term "hybrid storage device" refers to a data storage device that includes both rotating storage media and solid-state storage media. The hybrid storage device 202 is adapted to communicate with a host system 204. In a particular embodiment, the host system 204 can be a computer, a processor, a personal digital assistant (PDA), another electronic device, or any combination thereof.

The hybrid storage device 202 includes recording subsystem circuitry 206 and a head-disc assembly 208. The recording subsystem 206 includes storage device read/write control circuitry 210 and disc-head assembly control circuitry 220. The recording subsystem circuitry 206 includes an interface circuit 212, which includes a data buffer for temporarily buffering the data and a sequencer for directing the operation of the read/write channel 216 and the preamplifier 250 during data transfer operations. The interface circuit 212 is coupled to the host system 204 and to a control processor 218, which is adapted to control operation of the hybrid storage device 202. In a particular embodiment, the control processor 218 includes data corruption detection logic 238 that is adapted to detect data corruption, for example, when two data blocks are mapped to the same logical block address. In a particular embodiment, that data corruption detection logic 238 can be processor executable instructions that are executed by the control processor 218.

The control processor 218 is coupled to a servo circuit 222 that is adapted to control the position of one or more read/write heads 254 relative to one or more discs 256 as part of a servo loop established by the one or more read/write heads 254. Generally, the one or more read/write heads 254 are mounted to a rotary actuator assembly to which a coil 252 of a voice coil motor (VCM) is attached. As is known in the art, a VCM includes a pair of magnetic flux paths between which the coil 252 is disposed so that the passage of current through the coil causes magnetic interaction between the coil 252 and the magnetic flux paths, resulting in the controlled rotation of the actuator assembly and the movement of the one or more heads 254 relative to the surfaces of the one or more discs 256. The servo circuit 222 is used to control the application of current to the coil 252, and hence the position of the heads 254 with respect to the tracks of the one or more discs 256.

In general, the disc-head assembly control circuitry 220 includes the servo circuit 222 and includes a spindle circuit 226 that is coupled to a spindle motor 258 to control the rotation of the one or more discs 256. The hybrid storage device 202 also includes an auxiliary power device 228 that is coupled to the disc-head assembly control circuitry 220 and that is adapted to operate as a power source when power to the hybrid storage device 202 is lost. In a particular embodiment, the auxiliary power device 228 can be a capacitor or a battery that is adapted to supply power to the hybrid storage device 202 under certain operating conditions. In a particular example, the auxiliary power device 228 can provide a power supply to the recording subsystem assembly 206 and to the disc-head assembly 208 to record data to the one or more discs 256 when power is turned off. Further, the auxiliary power device 228 may supply power to the recording subsystem assembly 206 to record data to a data (NAND) flash 230 or to a code (NOR) flash 234 when power is turned off.

Additionally, the hybrid storage device 202 includes the data (NAND) flash 230, a dynamic random access memory (DRAM) 232, the code (NOR) flash 234, other memory 236, or any combination thereof. In a particular embodiment, the code (NOR) flash 234 stores duplicate data conflict resolution instructions 240. In a particular embodiment, the NAND flash 230 may store a logical block address (LBA) lookup table that represents a mapping of logical block addresses to physical memory locations within the one or more discs 256.

In a particular embodiment, the code (NOR) flash 234 is a processor-readable medium that embodies duplicate conflict resolution instructions 240 that are executable by the control processor 218 to resolve a conflict between at least two copies of a data block that are mapped to a single logical block address. In a particular embodiment, after an unexpected power loss event, the data corruption detection logic 238 detects that the unexpected power loss event previously occurred. The data corruption detection logic 238 is adapted to access metadata associated with data blocks stored at the one or more discs 256 to reconstruct the LBA lookup table 231. The metadata may be stored at a reserved area at the one or more discs 256, where the reserved area is restricted to access by the control processor 218 and is reserved for storage of metadata, including LBA data. In a particular example, the reserved area may represent a physical area or a logical area of the one or more discs 256. In another particular example, the LBA lookup table 231 may be reconstructed using the stored metadata from the one or more discs 256 and metadata associated with another memory, such as the data NAND flash 230.

During reconstruction of the LBA lookup table 231, the data corruption detection logic 238 may detect metadata associated with two or more data blocks that refer to the same LBA. In this instance, the data corruption detection logic 238 is adapted to initiate the duplicate conflict resolution logic 240 to identify and select one of the data blocks as a valid data block based on the metadata. For example, the duplicate conflict resolution instructions 240 is adapted to determine a valid physical page value for each copy of the multiple copies, to determine a data diversity value for each copy of the multiple copies, and to select one of the copies as valid that has a greatest number of valid physical pages, a greatest amount of data diversity, or any combination thereof. In a particular example, a most recent copy includes recently added data, resulting in more valid physical pages and higher data diversity.

In a particular embodiment, the duplicate conflict resolution instructions 240 include a fifth instruction to select the copy from the multiple copies using a random selection algorithm when the valid physical page values and the data diversity values of the multiple copies are equal. For example, if there are two duplicate data blocks having the same number of pages and the same data diversity, the duplicate conflict resolution instructions 240 are executable by the control processor 218 to pick one as a valid data block.

In another particular embodiment, the head-disc assembly 208 can be replaced with a solid-state storage media, such as a flash memory, an electrically programmable memory, other programmable solid-state memory, or any combination thereof. When the head-disc assembly 208 is replaced with a solid-state storage media, the spindle circuit 222 and the servo circuit 222 can also be omitted.

In a particular embodiment, the code (NOR) flash 234 is a processor-readable medium that is accessible to the control processor 218. The code (NOR) flash 234 stores a plurality of instructions that are executable by the control processor 218. In a particular example, the code (NOR) flash 234 includes operating instructions for the control processor 218, including the duplicate conflict resolution instructions 240 and the data corruption detection logic 238. In a particular embodiment, the duplicate conflict resolution instructions 240 include a first instruction that is executable by a processor to reconstruct a logical block address (LBA) lookup table from metadata stored at a storage media after an unexpected power loss event. The duplicate conflict resolution instructions 240 further include a second instruction that is executable by the processor to detect a data error including multiple copies of a data block mapped to a single logical block address associated with a storage media and include a third instruction that is executable by the processor to determine a valid physical page value for each copy of the multiple copies. Additionally, the duplicate conflict resolution instructions 240 include a fourth instruction that is executable by the processor to determine a data diversity value for each copy of the multiple copies. In a particular embodiment, the valid physical page value and the data diversity value are determined from metadata associated with data blocks stored at the storage media. The metadata may be stored in spare bytes of the storage media or at a reserved area of the storage media. Further, the duplicate conflict resolution instructions 240 include a fifth instruction that is executable by the processor to select a copy from the multiple copies when one of the valid physical page value and the data diversity value associated with the copy is greater than respective valid physical page values and data diversity values of other copies of the multiple copies.

In a particular embodiment, the duplicate conflict resolution instructions 240 further include a sixth instruction executable by the processor to select the copy from the multiple copies using a random selection algorithm or a load-balancing selection algorithm when the valid physical page values and the data diversity values of the multiple copies are equal.

Figure 3:
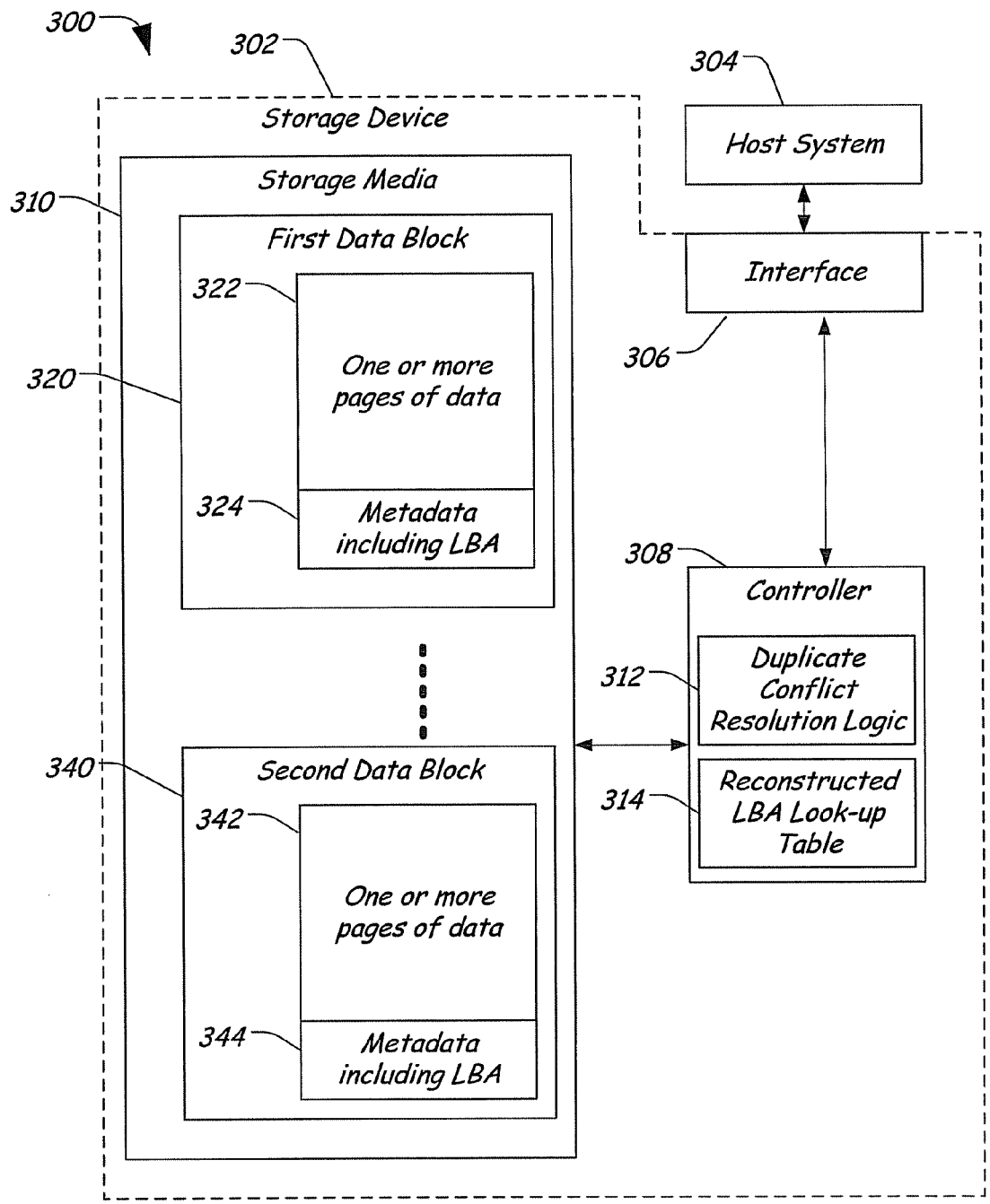
FIG. 3 is a block diagram of a third particular illustrative embodiment of a system including a storage device with data conflict resolution logic.

FIG. 3 is a block diagram of a third particular illustrative embodiment of a system 300 including a storage device 302 with data conflict resolution logic. The storage device 302 is adapted to communicate with a host system 304, which may be a computer, a processor, another device, or any combination thereof. The storage device 302 includes an interface 306 that is coupled to the host system 304. The interface 306 is also coupled to a controller 308, which is adapted to control operation of the storage device 302. In a particular example, the controller 308 can be a processor, a control circuit, or any combination thereof. The controller 308 is also coupled to a storage media 310.

The controller 308 includes duplicate conflict resolution logic 312 to detect and resolve conflicts between duplicate data blocks. In a particular embodiment, the duplicate conflict resolution logic 312 includes instructions that are executable by the controller 308. In a particular embodiment, upon restart and re-initialization after an unexpected power loss event, the duplicate conflict resolution logic 312 is adapted to determine that an unexpected power loss event had previously occurred and to reconstruct an LBA lookup table based on actual data stored at the storage media 310 to produce a reconstructed LBA lookup table 314. During reconstruction of the LBA lookup table, the duplicate conflict resolution logic is adapted to detect data corruption, such as two data blocks having metadata that refers to the same logical block address (LBA). The duplicate conflict resolution logic 312 is adapted to resolve conflicts between such LBA conflicts in response to detecting the data corruption. In a particular embodiment, the duplicate conflict resolution logic 312 is adapted to select a particular data block as a valid data block based on the metadata in order to complete the reconstructed LBA lookup table 314.

The storage media 310 includes a first data block 310 and a second data block 340. The first data block 310 includes one or more pages of data 322 and associated metadata including LBA data 324. In a particular embodiment, the storage media 310 is a solid-state memory device, such as a NAND flash memory, and the metadata including LBA data 324 is stored in spare bytes of the storage media 310. The second data block 340 also includes one or more pages of data 342 and associated metadata including LBA data 344.

In a particular embodiment, after an unexpected power loss event, the controller 308 loads the duplicate conflict resolution logic 312 from a memory, such as the code NOR flash 234 illustrated in FIG. 2. The controller 308 executes the duplicate conflict resolution logic 312 to determine that the unexpected power loss event previously occurred. In this instance, the controller 308 does not load an LBA lookup table from memory, since the LBA lookup table may not match the state of data stored at the storage media 310. Instead, the duplicate conflict resolution logic 312 scans the metadata stored at the storage device 310, including the metadata including the LBA data 324 and 344 of the first and second data blocks 320 and 340, to produce the reconstructed LBA lookup table 314.

In a particular embodiment, the metadata including the LBA data 324 and 344 of the first and second data blocks 320 and 340 refers to the same LBA. In this instance, the duplicate conflict resolution logic 312 is adapted to identify a latest copy from the first and second data blocks 320 and 340 as a valid copy. In a particular embodiment, the latest copy is determined based on a number of valid physical pages, based on a number of different sectors (i.e., data diversity), or any combination thereof. In another particular embodiment, the latest copy may be selected randomly if the number of valid physical pages and the data diversity were the same between the first and second data blocks. Once the valid copy is determined, the duplicate conflict resolution logic 312 updates the reconstructed LBA lookup table 314 using the valid data. Further, the controller 308 is adapted to write the reconstructed LBA lookup table 314 to the storage media 310.

In a particular example, the first data block 320 has the most valid physical pages according to a comparison of the first and second metadata including LBA data 324 and 344. Accordingly, the duplicate conflict resolution logic 312 selects the first data block 320 as the valid data block. In another particular example, the first and second data blocks 320 and 340 have the same number of valid physical pages, but the second data block 340 has greater data diversity (more different sectors) than the first data block 320. In this instance, the duplicate conflict resolution logic 312 selects the second data block 340 as the valid data block. In still another particular example, when the first and second data blocks 320 and 340 include the same number of valid physical pages and the same data diversity, the duplicate conflict resolution logic 312 selects one of the data blocks, using another selection strategy. In a particular example, the other selection strategy may be used by the duplicate conflict resolution logic 312 to select a most recent data block, to randomly select the data block, to choose a data block from a sector that is less frequently used than another to load balance the usage of the storage media. In a particular example, any selection techniques can be used, when the first and second data blocks 320 and 340 are otherwise equal.

Figure 4:
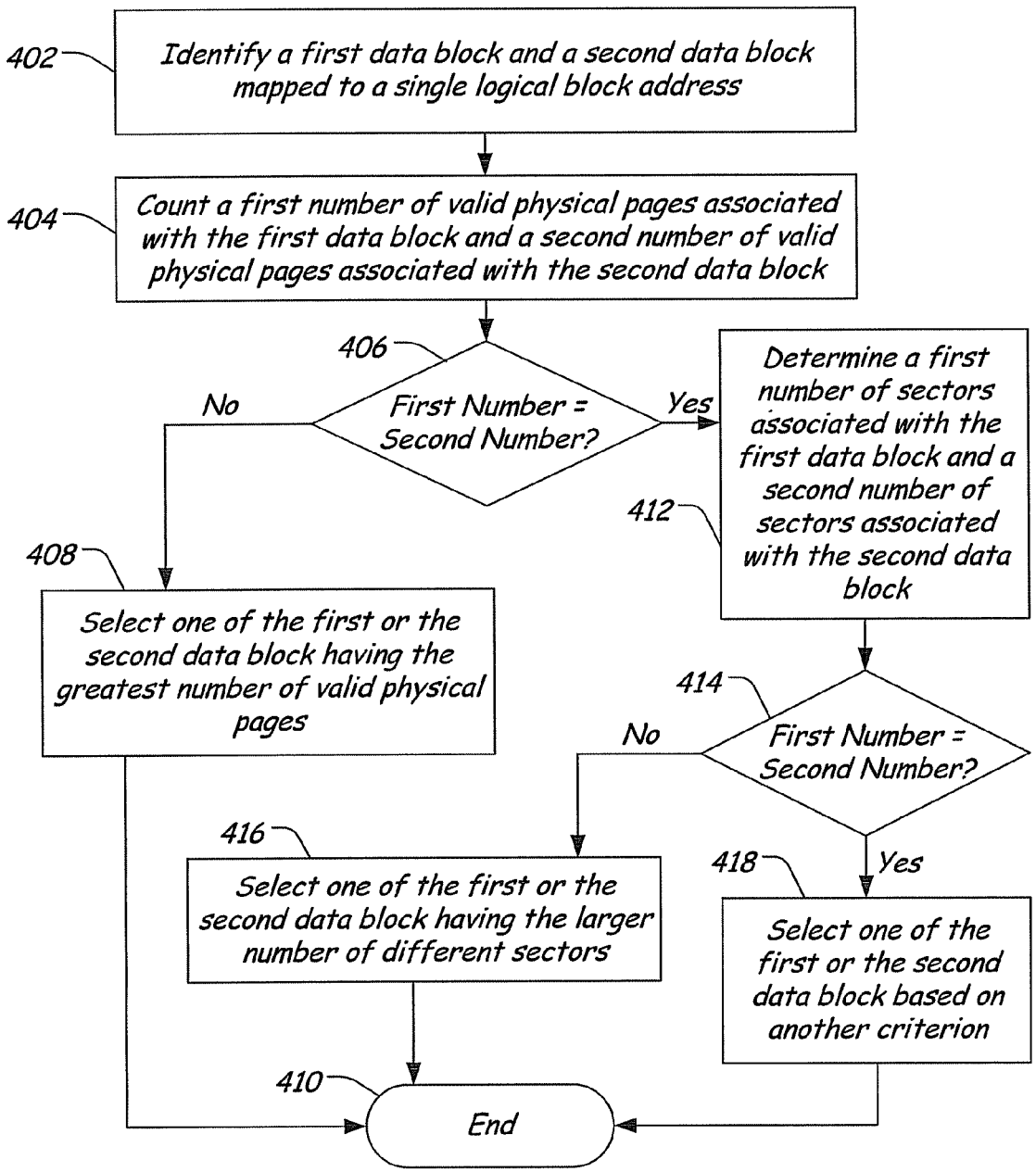
FIG. 4 is a flow diagram of a particular illustrative embodiment of a method of resolving a data conflict within a memory device.

FIG. 4 is a flow diagram of a particular illustrative embodiment of a method of resolving a data conflict within a memory device. At 402, a first data block and a second data block are identified that are mapped to a single logical block address (i.e., the same logical block address). Moving to 404, a first number of valid physical pages associated with the first data block and a second number of valid physical pages associated with the second data block are counted. Advancing to 406, when the first number and the second number are not equal, the method advances to 408 and one of the first or the second data block is selected that has the greatest number of valid physical pages. The method terminates at 410.

Returning to 406, if the first number and the second number are equal, the method advances to 412 and a first number of sectors associated with the first data block and a second number of sectors associated with the second data block are determined. Continuing to 414, if the first and second numbers of sectors are not equal, the method proceeds to 416 and one of the first or the second data block is selected that has the larger number of different sectors (i.e., the selected data block has greater data diversity). The method terminates at 410.

Returning to 414, if the first and second numbers of sectors are equal, one of the first or the second data block is selected based on another criterion. The method terminates at 410.

Figure 5:
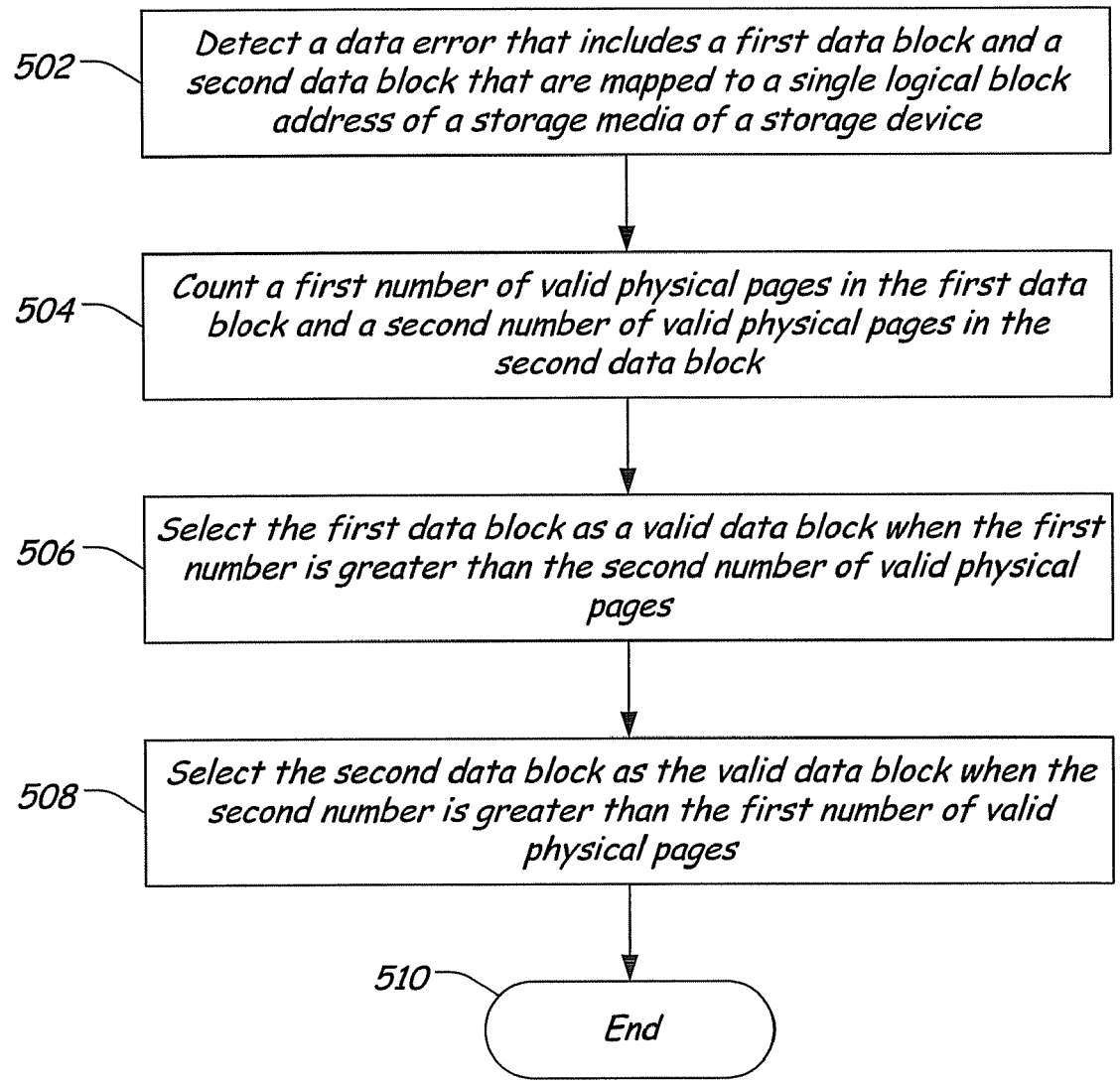
FIG. 5 is a flow diagram of a second particular illustrative embodiment of a method of resolving a data conflict within a memory device.

FIG. 5 is a flow diagram of a second particular illustrative embodiment of a method of resolving a data conflict within a memory device. At 502, a data error is detected that include a first data block and a second data block that are mapped to a single logical block address of a storage media of a storage device. In a particular example, the data error is detected when first meta-data associated with the first data block and second meta-data associated with the second data block indicate the single logical block address. In a particular embodiment, the data error is detected by error detection logic associated with a controller of the storage device. In a particular example, the storage media is a solid-state data storage media.

Moving to 504, a first number of valid physical pages in the first data block and a second number of valid physical pages in the second data block are counted. Continuing to 506, the first data block is selected as a valid data block when the first number is greater than the second number of valid physical pages. Advancing to 508, the second data block is selected as the valid data block when the second number is greater than the first number of valid physical pages. The method terminates at 510.

In a particular embodiment, when the first number is equal to the second number of valid physical pages, the method further includes counting a third number of different sectors in the first data block and a fourth number of different sectors in the second data block, selecting the first data block when the third number is greater than the fourth number of different sectors, and selecting the second data block when the fourth number is greater than the third number of different sectors. In a particular embodiment, the third number and the fourth number of different sectors are counted using first spare data of a first page associated with meta-data related to the first data block and second spare data of a second page related to the second data block to determine a data usage frequency and a diversity of data contained in the first data block and the second data block. In a particular example, one of the first data block and the second data block is selected based on the usage frequency and the diversity of data.

In a particular example, when the third number is equal to the fourth number, the method further includes applying a selection algorithm to select one of the first data block and the second data block. In a particular example, the selection algorithm includes a modification date selection algorithm or a random data block selection algorithm. In another particular embodiment, the method includes detecting that an unexpected power loss event previously occurred and reconstructing a logical block address (LBA) lookup table from metadata associated with data blocks stored at the storage media. The data error is detected during reconstruction of the LBA lookup table.

In general, the systems and methods illustrated and described with respect to FIGS. 1-5 above can be applied to different types of storage devices, including solid-state storage devices, storage devices that have rotatable storage media, or hybrid storage devices that include both solid-state storage media and rotatable storage media. Further, it should be understood that the methods disclosed with respect to FIGS. 4 and 5 can be implemented to resolve a data conflict between metadata for multiple data blocks that refers to the same logical block address (LBA). Generally, the conflict arises after an unexpected power loss event where the stored LBA lookup table cannot be relied upon to contain the most up-to-date data related to data blocks stored at the storage media. Accordingly, the controller of the storage device is adapted to reconstruct the LBA lookup table from metadata associated with the data blocks by scanning the metadata of the storage media. In some instances, the data and the metadata may be stored at the same storage media. In another instance, the metadata and the data blocks may be stored at different storage media. In either case, the LBA lookup table is reconstructed from the metadata, and the duplicate conflict resolution logic is used to resolve conflicts when two or more metadata associated with different data blocks refers to the same LBA. The duplicate conflict resolution logic is adapted to select a latest copy of the data block from the multiple data blocks based on the number of valid physical pages and the amount of data diversity among the multiple data blocks.

Although the present invention has been described with reference to preferred embodiments, workers skilled in the art will recognize that changes may be made in form and detail without departing from the spirit and scope of the invention.

What is claimed is:

1. A controller adapted to control read/write access to a storage media, the controller including data corruption detection logic to reconstruct a logical block address (LBA) lookup table from metadata stored at the storage media upon restart and re-initialization after a power loss event, the controller further including duplicate conflict resolution logic to identify a valid data block from multiple data blocks that refer to a single LBA, the duplicate conflict resolution logic to count a first number of valid physical pages and a second number of different sectors in each of the multiple data blocks, the duplicate conflict resolution logic to select the valid data block from the multiple data blocks based on at least one of the first and second numbers.

2. The controller of claim 1, wherein the duplicate conflict resolution logic is adapted to select the valid data block using a selection algorithm when the first number of each of the multiple data blocks is equal and when the second number of each of the multiple data blocks is equal.

3. The controller of claim 2, wherein the selection algorithm includes a load-balancing selection algorithm adapted to select the valid data block from the multiple data blocks based on frequency data associated with usage of the storage media.

4. The controller of claim 1, wherein the data conflict resolution logic is adapted to resolve conflicts between the multiple data blocks when metadata is spread into spare bytes of the storage media.

5. The controller of claim 1, wherein the reconstructed LBA lookup table includes the LBA of the valid data block, and wherein the controller is adapted to store the LBA lookup table to the storage media.

6. The controller of claim 1, wherein the metadata refers to data blocks stored at a second storage media, wherein the controller is adapted to store the blocks of data to the second storage media and to store metadata related to the blocks of data to the storage media.

7. The controller of claim 1, wherein the controller is included within a storage device, the storage device further comprising:
- an interface responsive to a host system;
- a head-disc assembly including a preamplifier, one or more voice coils, one or more read/write heads, and one or more rotatable discs, the one or more rotatable discs adapted to store data;
- a head-disc control circuit including a servo circuit to position the one or more read/write heads via the one or more voice coils and including a spindle circuit coupled to a spindle motor to rotate the one or more rotatable discs; and
- a read/write channel coupled between the controller and the preamplifier;
- wherein at least one of the one or more rotatable discs includes a reserved storage area adapted to store metadata associated with one or more data blocks and wherein the controller is adapted to reconstruct the LBA lookup table using the stored metadata from the one or more rotatable discs and metadata associated with the storage media.

8. A method comprising:
- detecting a data error that includes a first data block and a second data block that are mapped to a single logical block address of a storage media of a storage device;
- counting a first number of valid physical pages in the first data block and a second number of valid physical pages in the second data block;
- counting a third number of different sectors in the first data block and a fourth number of different sectors in the second data block; and
- selecting the first data block as a valid data block responsive to the first number greater than the second number of valid physical pages or the third number being greater than the fourth number of different sectors; or
- selecting the second data block as the valid data block responsive to the second number being greater than the first number of valid physical pages or the fourth number being greater than the third number of different sectors.

9. The method of claim 8, wherein when the third number is equal to the fourth number, and wherein the method further comprises applying a selection algorithm to select one of the first data block and the second data block.

10. The method of claim 9, wherein the selection algorithm includes a modification date selection algorithm, a random data block selection algorithm, or a load-balancing selection algorithm.

11. The method of claim 9, wherein counting the third number and the fourth number of different sectors comprises using first spare data of a first flash page associated with meta-data related to the first data block and second spare data of a second flash page related to the second data block to determine a data usage frequency and a diversity of data contained in the first data block and the second data block.

12. The method claim 11, wherein one of the first data block and the second data block is selected as the valid data block based on the usage frequency and the diversity of data.

13. The method of claim 8, wherein the data error comprises first metadata associated with the first data block and second metadata associated with the second data block indicating the single logical block address.

14. The method of claim 8, further comprising:
- detecting that an unexpected power loss event previously occurred; and
- reconstructing a logical block address (LBA) lookup table from metadata associated with data blocks stored at the storage media;
- wherein the data error is detected during reconstruction of the LBA lookup table.

15. The method of claim 8, wherein the storage media comprises a solid-state data storage media.

16. A non-transitory processor-readable storage medium embodying instructions executable by a processor to resolve a conflict between at least two copies of a data block that are mapped to a single logical block address, the instructions comprising:
- a first instruction executable by a processor to reconstruct a logical block address (LBA) lookup table from metadata stored at a storage media after an unexpected power loss event;
- a second instruction executable by the processor to detect a data error comprising multiple copies of a data block mapped to a single logical block address associated with a storage media;
- a third instruction executable by the processor to determine a valid physical page value by counting valid physical pages for each copy of the multiple copies;
- a fourth instruction executable by the processor to determine a data diversity value by counting different sectors for each copy of the multiple copies; and
- a fifth instruction executable by the processor to select a copy from the multiple copies when one of the valid physical page value and the data diversity value associated with the copy is greater than respective valid physical page values and data diversity values of other copies of the multiple copies.

17. The non-transitory processor-readable storage medium of claim 16, wherein the instructions further comprise a sixth instruction executable by the processor to select the copy from the multiple copies using a random selection algorithm or a load-balancing selection algorithm when the valid physical page values and the data diversity values of the multiple copies are equal.

18. The non-transitory processor-readable storage medium of claim 16, wherein the valid physical page value and the data diversity value are determined from metadata associated with data blocks stored at the storage media.

19. The non-transitory processor-readable storage medium of claim 18, wherein the metadata is stored in spare bytes of the storage media.

20. The non-transitory processor-readable storage medium of claim 18, wherein the metadata is stored in a reserved area of the storage media.

* * * * *